United States Patent
Bogart et al.

(10) Patent No.: US 6,640,532 B1
(45) Date of Patent: Nov. 4, 2003

(54) LAWN SWEEPER CONSTRUCTED FOR UPRIGHT STORAGE AND HAVING AN ADJUSTABLE HITCH CLEVIS ASSEMBLY

(75) Inventors: Bruce E. Bogart, Georgetown, IN (US); James D. Scobee, Louisville, KY (US); Bruce A. Thomas, LaGrange, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 0 days.

(21) Appl. No.: 10/102,258

(22) Filed: Mar. 19, 2002

Related U.S. Application Data
(60) Provisional application No. 60/277,297, filed on Mar. 20, 2001.

(51) Int. Cl.$^7$ ................................................ A01D 7/06
(52) U.S. Cl. ..................................... 56/400.02; 15/149
(58) Field of Search .............................. 56/350, 400.01, 56/384, 396, 400.02; 15/79.1, 149; 280/490.1, 490.3, 407

(56) References Cited

U.S. PATENT DOCUMENTS

| | | | | |
|---|---|---|---|---|
| 3,591,883 A | * | 7/1971 | Armstrong et al. | ........... 15/149 |
| 3,597,786 A | * | 8/1971 | Ruhl | ........................ 15/79.1 |
| 3,664,686 A | * | 5/1972 | Anderson | ................ 280/490.1 |
| 5,934,698 A | * | 8/1999 | Despain | ................... 280/490.1 |
| 6,421,997 B1 | * | 7/2002 | Mann | ........................ 56/384 |

* cited by examiner

Primary Examiner—Robert E. Pezzuto
(74) Attorney, Agent, or Firm—Stites & Harbison, PLLC; David W. Nagle, Jr.

(57) ABSTRACT

A lawn sweeper generally comprises a tow bar adapted to be connected to a draw bar of a lawn implement, a brush housing containing a plurality of brushes mounted for rotation, and a hamper assembly secured behind the brush housing. A hitch clevis assembly is used to secure the tow bar of the lawn sweeper to the draw bar of a lawn implement and is adjustable in that it allows for attachment at multiple discrete height settings. The preferred lawn sweeper can be easily and rapidly manipulated into an upright storage position, with the hamper assembly having a collapsible frame for storage.

13 Claims, 6 Drawing Sheets

LAWN SWEEPER CONSTRUCTED FOR UPRIGHT STORAGE AND HAVING AN ADJUSTABLE HITCH CLEVIS ASSEMBLY

CROSS REFERENCES TO RELATED APPLICATION

This application claims priority from U.S. Provisional Application Ser. No. 60/277,297 filed Mar. 20, 2001, and relates to a lawn sweeper adapted to be connected to the draw bar of a lawn implement (e.g., a tractor, mower, or all-terrain vehicle) for sweeping yard clippings and/or other debris into a hamper. The entire disclosure contained in U.S. Provisional Application Ser. No. 60/277,297 is incorporated herein by this reference.

BACKGROUND OF THE INVENTION

The present invention relates to a lawn sweeper adapted to be connected to the draw bar of a lawn implement (e.g., a tractor, mower, or all-terrain vehicle) for sweeping yard clippings and/or debris into a hamper.

Various lawn sweepers have been developed and exist in the prior art. A typical lawn sweeper generally includes a plurality of rotating brushes, blades, or similar mechanical means to sweep yard clippings and/or other debris from the underlying ground surface into a hamper that is secured behind the rotating brushes, blades, or similar mechanical means. For example, U.S. Pat. No. 4,221,018 issued to Hajdu describes one such prior art lawn sweeper. Perhaps more importantly, U.S. Pat. No. 4,221,018 provides some description of the wide variety of lawn sweepers that exist in the prior art. U.S. Pat. No. 4,221,018 is thus incorporated herein by this reference.

Nevertheless, there still are problems associated with prior art lawn sweepers for which no solutions have been proposed. One problem with prior art lawn sweepers relates to their adaptability. Specifically, a typical lawn sweeper has a tow bar that is selectively connected to the draw bar of a lawn implement, such as a tractor, mower, or all-terrain vehicle; the brush housing is operably secured to the tow bar, with the hamper secured behind the brush housing. If the height of the draw bar and tow bar with respect to the underlying ground surface (i.e., the lawn) are not the same, the resulting non-parallel relationship between the lawn sweeper and the lawn may adversely affect the efficiency of the sweeping function. In other words, the brushes of the lawn sweeper may not properly contact the lawn, or the hamper may drag along the lawn, causing damage or wear to the hamper and/or causing stress to the structural members of the lawn sweeper. Furthermore, various attachments have been developed for lawn sweepers. One such attachment is a dethatcher for the removal of lawn thatch. Since a dethatcher normally uses spring-loaded tines to penetrate the turf and pull thatch out, it is very important that the tow bar of the lawn sweeper remain relatively level and parallel to the underlying ground surface so as to ensure the proper spatial relationship between the tines and the ground surface.

Another problem with prior art lawn sweepers relates to their size. Specifically, prior art lawn sweepers have a substantial "footprint" which prevents them from being easily stored in a small space, such as a garage or a shed.

It is therefore an object of the present invention to provide a lawn sweeper that can be readily and easily connected to the draw bar of a lawn implement at various heights to ensure that the tow bar is maintained in a plane that is substantially parallel to the underlying ground surface.

It is also an object of the present invention to provide an lawn sweeper that can be manipulated into an upright storage position, dramatically decreasing its footprint.

These and other objects and advantages of the present invention will become apparent upon a reading of the following description and appended claims.

SUMMARY OF THE INVENTION

The present invention is a lawn sweeper adapted to be connected to the draw bar of a lawn implement (e.g., a tractor, mower, or all-terrain vehicle) for sweeping yard clippings and/or other debris into a hamper. A preferred lawn sweeper made in accordance with the present invention generally comprises a tow bar adapted to be connected to a draw bar of a lawn implement, a brush housing containing a plurality of brushes mounted for rotation, and a hamper assembly secured behind the brush housing. As with common lawn sweepers, rotation of the brushes contained within said brush housing sweeps yard clippings and/or other debris into said hamper assembly.

In accordance with teachings of the present invention, a hitch clevis assembly is used to secure the tow bar of the lawn sweeper to the draw bar of a lawn implement. This hitch clevis assembly is adjustable in that it allows for attachment at multiple discrete height settings.

Furthermore, the preferred lawn sweeper can be easily and rapidly manipulated into an upright storage position. In this regard, the hamper assembly can be detached from the brush housing and tow bar by removing a pair of pins. A user can then grasp the tow bar and rotate the combination tow bar and brush housing to an upright position. The hamper assembly may also be collapsed for storage and be stored on and against the upright tow bar and brush housing.

DETAILED DESCRIPTION OF THE PRESENT INVENTION

The present invention is a lawn sweeper adapted to be connected to the draw bar of a lawn implement (e.g., a tractor, mower, or all-terrain vehicle) for sweeping yard clippings and/or other debris into a hamper.

Figure 1:
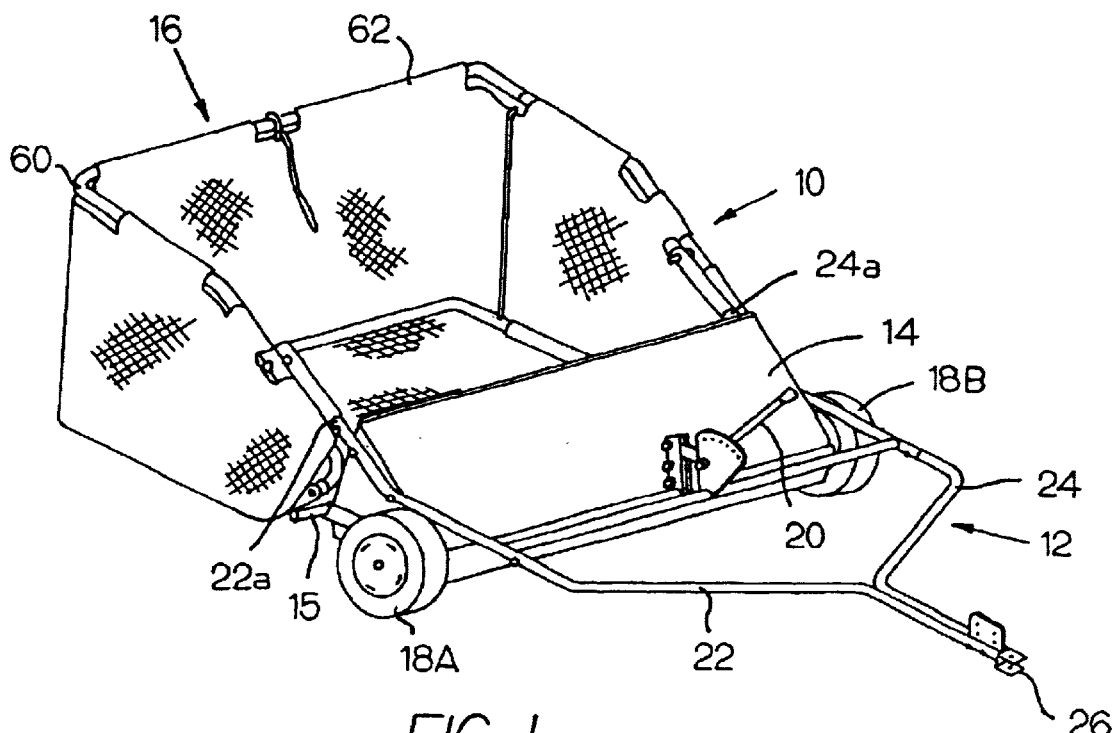
FIG. 1 is a perspective view of a preferred lawn sweeper made in accordance with the present invention.

Referring first to the perspective view of FIG. 1, a preferred lawn sweeper 10 made in accordance with the present invention generally comprises a tow bar 12 adapted to be connected to a draw bar of a lawn implement (not shown), a brush housing 14 containing a plurality of brushes (not shown) mounted for rotation, and a hamper assembly 16 secured behind the brush housing 14. As with common lawn sweepers, rotation of the brushes contained within the brush housing 14 sweeps yard clippings and/or other debris into the hamper assembly 16. Specifically, the brushes are mounted such that rotation of the wheels 18A, 18B of the lawn sweeper 10 cause simultaneous rotation of the brushes. Furthermore, although not essential to the present invention, as shown in FIG. 1, the preferred lawn sweeper 10 includes a lift handle 20 which allows for some manual adjustment of the heights of the brushes relative to the underlying ground surface.

Referring still to FIG. 1, the tow bar 12 is preferably comprised of two discrete tow tubes 22, 24. These tow tubes 22, 24 are secured to opposite sides of the brush housing 14. As shown in FIG. 1, the tow tubes 22, 24 each have a portion 22a, 24a which extends just beyond the brush housing 14, the importance of which is described in further detail below.

Figure 2:
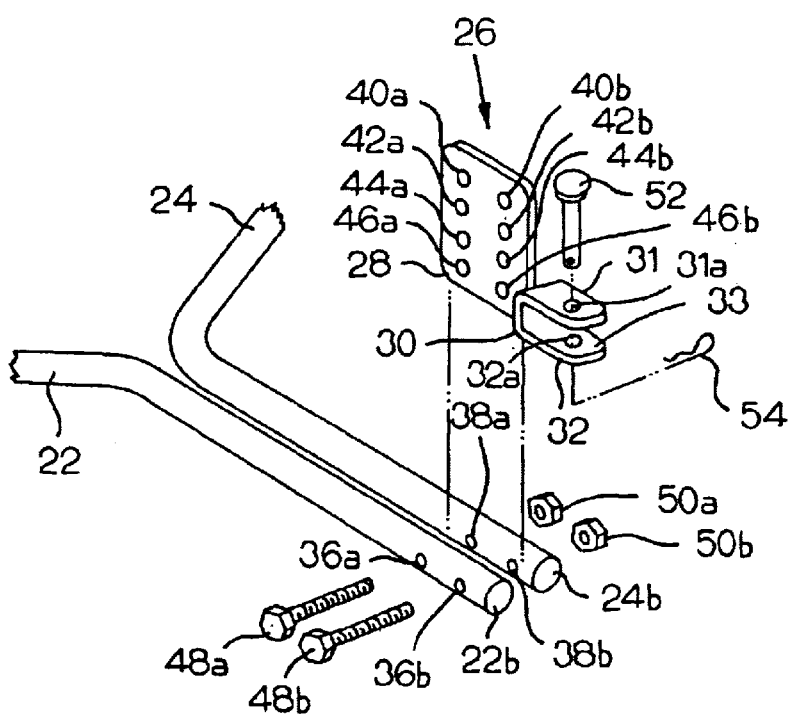
FIG. 2 is an enlarged, exploded perspective view of the hitch clevis assembly of the lawn sweeper of FIG. 1.

Referring now to the enlarged, exploded perspective view of FIG. 2, the tow tubes 22, 24 are joined near the distal ends 22b, 24b thereof, with the hitch clevis assembly 26 interposed between the tow tubes 22, 24. In this regard, each of the tow tubes 22, 24 preferably defines a pair of openings 36a, 36b, 38a, 38b therethrough. Similarly, the hitch clevis assembly 26 has an upright member 28 that defines multiple pairs of openings therethrough. In the preferred embodiment illustrated in FIG. 2, there are four pairs of openings defined through the upright member 28 of the hitch clevis assembly 26 which are generally indicated by references numerals 40a, 40b, 42a, 42b, 44a, 44b, 46a, 46b. The upright member 28 can thus be manipulated into position between the tow tubes 22, 24 such that one of the pair of openings defined through the upright member 28 of the hitch clevis assembly 26 is in registry with the openings 36a, 36b, 38a, 38b defined through the tow tubes 22, 24. Then, bolts 48a, 48b or similar fasteners can be passed through the tow tubes 22, 24 and hitch clevis assembly 26 securing them to one another. In the preferred embodiment illustrated in FIG. 2, a pair of lock nuts 50a, 50b is used to secure the bolts 48a, 48b relative to the tow tubes 22, 24 and hitch clevis assembly 26.

As mentioned above, the hitch clevis assembly 26 has an upright member 28 that defines multiple pairs of openings 40a, 40b, 42a, 42b, 44a, 44b, 46a, 46b therethrough. This upright member 28 is secured to a clevis portion 30 comprised of first and second appendages 31, 32 and defining channel a 33 therebetween. Furthermore, the first and second appendages 31, 32 define respective openings 31a, 32a therethrough, said openings 31a, 32a being substantially in registry with one another. Although not shown in the attached Figures, the draw bar of the lawn implement behind which the lawn sweeper 10 is secured is received in the channel 33 defined by the clevis portion 30 of the hitch clevis assembly 26. The distal end of the draw bar has an opening therethrough that can be aligned with the openings 31a, 32a defined through the appendages 31, 32 of the clevis portion 30 of the hitch clevis assembly 26 so that a hitch pin 52 can be passed through the appendages 31, 32 and the draw bar to secure the lawn sweeper 10 to the lawn implement. In the preferred embodiment illustrated in FIG. 2, a cotter pin 54 is used to secure the hitch pin 52 relative to the clevis portion 30 of the hitch clevis assembly 26. Thus, detachment of the lawn sweeper 10 from the lawn implement requires only the removal of the hitch pin 52.

As mentioned above, one problem with prior art lawn sweepers relates to their adaptability. If the height of the approximately level draw bar of the lawn implement and the tow bar with respect to the underlying ground surface (i.e., lawn) are not the same, the resulting non-parallel relationship between the lawn sweeper and the lawn may adversely affect the efficiency of the sweeping function and provide undesirable conditions for the attachment of accessories such as a dethatcher. In accordance with teachings of the present invention, the upright member 28 of the hitch clevis assembly 26 defines multiple pairs of openings 40a, 40b, 42a, 42b, 44a, 44b, 46a, 46b that allow for discrete height adjustment. Specifically, the four pairs of openings 40a, 40b, 42a, 42b, 44a, 44b, 46a, 46b in the preferred embodiment illustrated in FIG. 2 allow for attachment to a draw bar of a lawn implement at at least six discrete height settings.

Figure 2A:
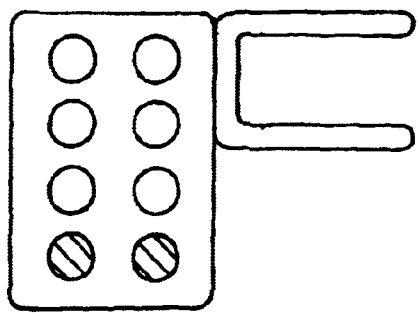
FIGS. 2A–2F illustrate the two orientations of the hitch clevis assembly of the lawn sweeper of FIG. 1, and how the hitch clevis assembly allows for attachment of the lawn sweeper to a lawn implement that has a draw bar between eleven inches high and six inches high.
Figure 2B:
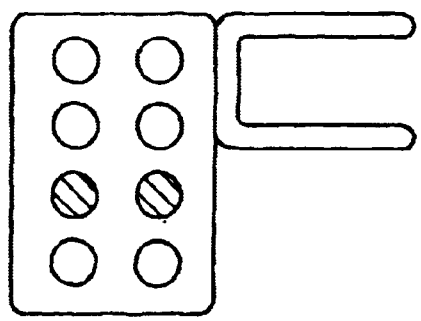
Figure 2C:
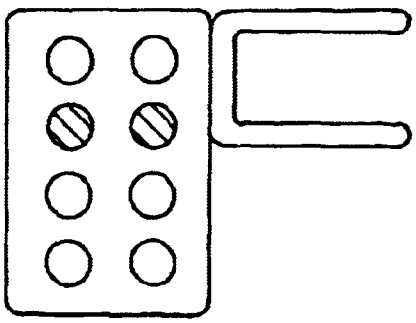
Figure 2D:
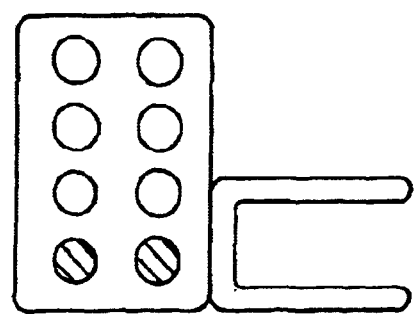
Figure 2E:
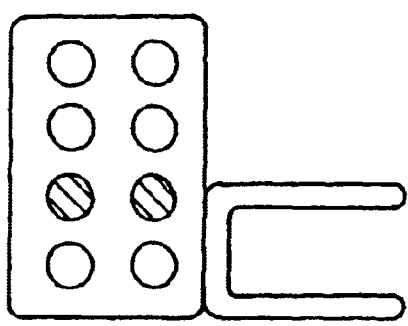
Figure 2F:
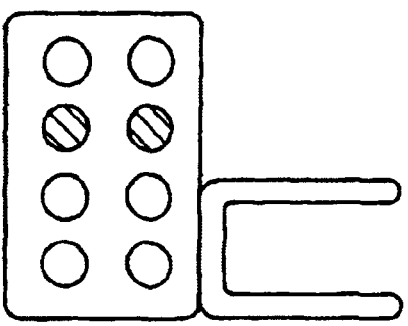

Referring now to FIGS. 2A–2F, the hitch clevis assembly 26 can be oriented either with the clevis portion 30 at the top (i.e., farther way from the underlying ground surface as shown in FIGS. 2A–2C) or at the bottom (i.e., nearer the underlying ground surface as shown in FIGS. 2D–2F). Therefore, in the preferred embodiment described herein and as illustrated in FIGS. 2A–2F, the hitch clevis assembly 26 allows for attachment of the lawn sweeper 10 to a lawn implement that has a draw bar between eleven inches high (FIG. 2A) and six inches high (FIG. 2F), in one-inch intervals as measured from the underlying ground surface.

Once the owner of the lawn sweeper 10 has chosen the best setting for the hitch clevis assembly 26 for a particular lawn implement, no future adjustments are necessary. However, should the owner of the lawn sweeper 10 acquire a new lawn implement or desire to attach the lawn sweeper 10 to another implement, the hitch clevis assembly 26 can be rapidly and easily adjusted as no separate spacers or other parts are needed.

Referring again to FIG. 1, the brush housing 14 includes a stop bar 15 that is secured to the surface of the brush housing 14 facing the hamper assembly 16 at a predetermined distance from said surface, the importance of which will be further described below.

Referring still to FIG. 1, the preferred hamper assembly 16 comprises a frame 60 and a fabric covering 62 secured around and to said frame 60. The fabric covering 62 is preferably made of vinyl, polyethylene sheeting, canvas or a similar material, but other materials may certainly be used without departing from the spirit and scope of the present invention. Furthermore, the fabric covering 62 can be secured to the frame 60 in any of a number of known manners, for example, by feeding the tubular members of the frame 60 through channels or pockets sewn into the fabric covering 62.

Figure 6:
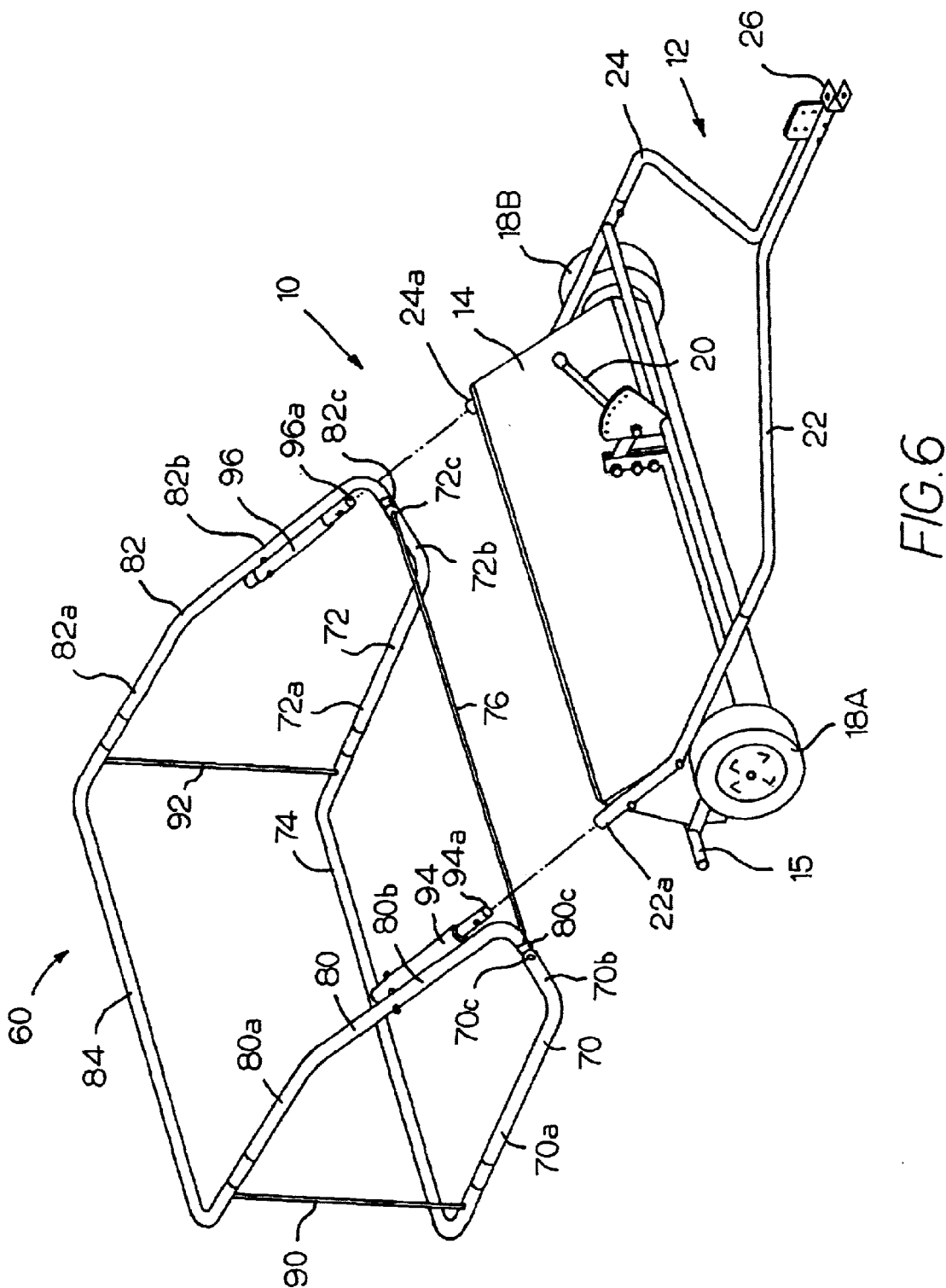
FIG. 6 is an exploded perspective view of the lawn sweeper of FIG. 1, illustrating the attachment of the frame of the hamper assembly to the brush housing, the fabric covering of the hamper assembly removed for clarity.

For a more detailed description of the frame 60 of the hamper assembly 16, reference is made to FIG. 6. As shown in FIG. 6, the frame 60 of the hamper assembly 16 is primarily comprised of a multiplicity of substantially tubular members that are joined to one another to create a three-dimensional frame structure enclosing a volume.

The "floor" or lower portion of the frame 60 of the hamper assembly 60 is formed by left and right lower side tubes 70, 72; a lower rear tube 74; and a front stop rod 76. The lower rear tube 74 is a C-shaped member that is adapted to receive the reduced diameter ends of the lower side tubes 70, 72. The front stop rod 76 is secured to the opposite ends of the lower side tubes 70, 72, as is further described below. Furthermore, as shown in the Figures, the left and right lower side tubes 70, 72 each have a first portion 70a, 72a that is substantially parallel to the underlying ground surface; the left and right lower side tubes 70, 72 also each have a second, upwardly inclined portion 70b, 72b, the importance of which is described in further detail below.

The upper portion of the frame 60 of the hamper assembly 16 is formed by left and right upper side tubes 80, 82 and an upper rear tube 84. The upper rear tube 84 is also a C-shaped member that is adapted to receive the reduced diameter ends of the upper side tubes 80, 82. Furthermore, as shown in the Figures, the left and right upper side tubes 80, 82 each have a first portion 80a, 82a that is substantially parallel to the corresponding portions 70a, 70b of the left and right lower side tubes 70, 72; the left and right upper side tubes 80, 82 also each have a second, downwardly inclined portion 80b, 82b so that the left and right upper side tubes 80, 82 can be pivotally connected to the corresponding left and right lower side tubes 70, 72.

Figure 7:
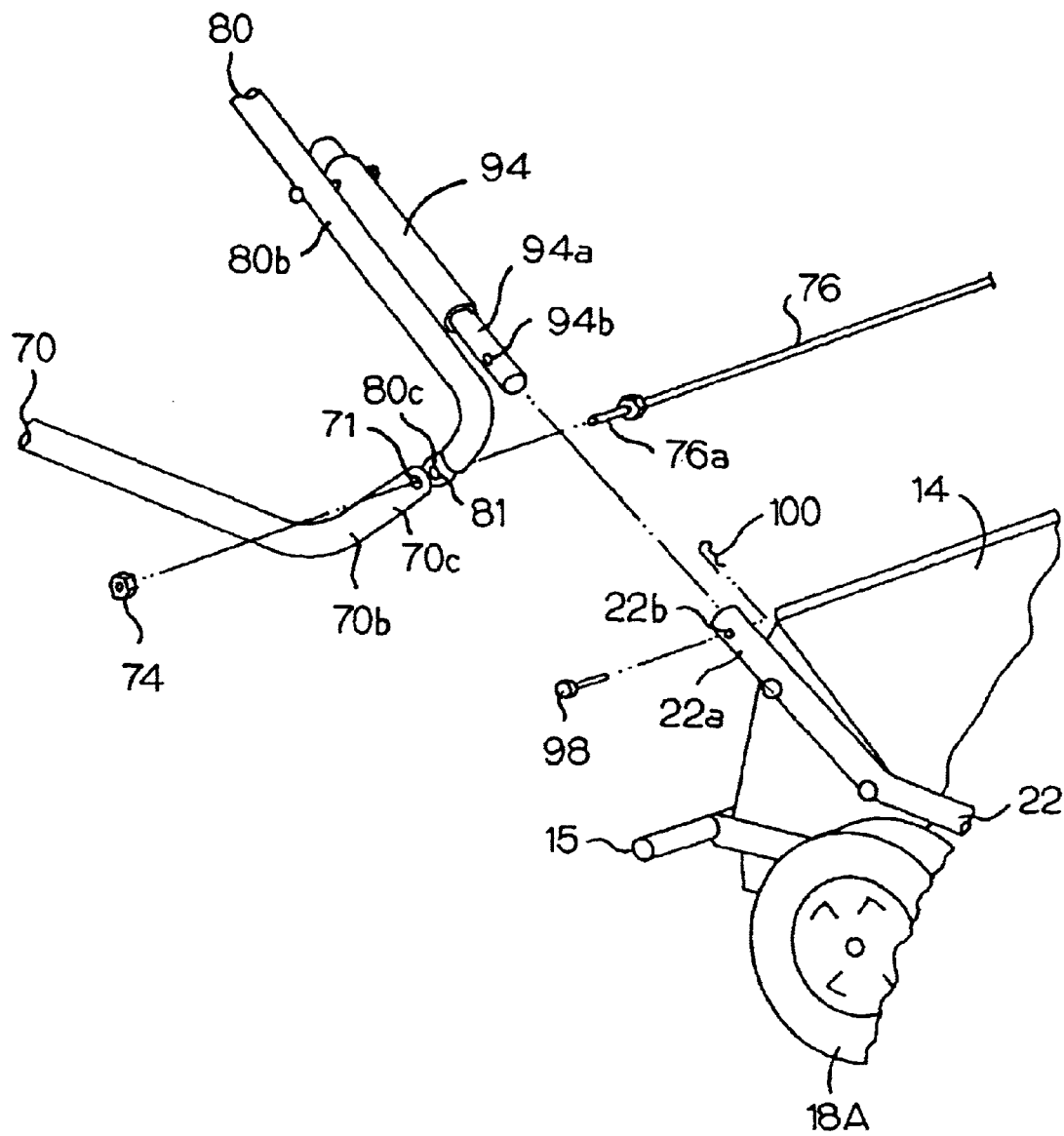
FIG. 7 is an enlarged, exploded perspective view of a pivotal connection of the frame of the hamper assembly of the lawn sweeper of FIG. 1, and further illustrates the connection of the hamper assembly to the brush housing and tow bar of the lawn sweeper.

FIG. 7 is an enlarged, exploded perspective view of the pivotal connection between the left upper side tube 80, the left lower side tube 70, and the front stop rod 76 of the frame 60 of the hamper assembly 16, and further illustrates the connection of the hamper assembly 16 to the brush housing 14 and tow bar 12 of the preferred lawn sweeper 10. As shown in FIG. 7, the left upper side tube 80 has a substantially flat portion 80c at the distal end thereof with an opening 81 defined through that substantially flat portion 80a. Similarly, the left lower side tube 70 has a substantially flat portion 70c at the distal end thereof with an opening 71 defined through that substantially flat portion 70a. The substantially flat portions 70c, 80c can thus be manipulated into an abutting relationship with the respective openings 71, 81 in registry with one another. A first end 76a of the stop rod 76 is then passed through the openings 71, 81 to pivotally secure the left upper side tube 80 and the left lower side tube 70 with respect to one another. In this regard, the first end of the stop rod 76 is preferably provided with threads such that a lock nut 74 can be used to secure the stop rod 76 with respect to the left upper side tube 80 and the left lower side tube 70.

A pivotal connection is similarly achieved at the intersection of the right upper side tube 82, the right lower side tube 72, and the front stop rod 76. These pivotal connections are critical to the effective storage of the lawn sweeper 10 of the present invention, as will be described in further detail below.

Referring again to FIG. 6, at the rear of the frame 60 of the hamper assembly 16, the vertical distance between the lower rear tube 74 and the upper rear tube 84 is preferably maintained by a pair of spring rods 90, 92. The spring rods 90, 92 are located near the rear corners of the frame 60 of the hamper assembly 16 and are retained in holes (not shown) in the respective upper and lower rear tubes 74, 84. Of course, various rods, bars or other spacing members could be used to maintain the vertical distance between the lower rear tube 74 and the upper rear tube 84 without departing from the spirit and scope of the present invention.

Finally, as also shown in FIG. 6, to secure the frame 60 of the hamper assembly 16 to the brush housing 14 and tow bar 12, left and right mount tubes 94, 96 are bolted or similarly secured to the respective inclined portions 80b, 82b of the left and right upper side tubes 80, 82. Each of the left and right mount tubes 94, 96 has a reduced diameter portion 94a, 96a at the distal end thereof.

As mentioned above, each of the tow tubes 22, 24 comprising the tow bar 12 has a portion 22a, 24a which extends just beyond the brush housing 14. Referring again to the enlarged, exploded perspective view of the FIG. 7, the reduced diameter portion 94a of the left mount tube 94 can thus be received in the tow tube 22 to connect the hamper assembly 16 to the brush housing 14 and tow bar 12. In this regard, it is preferred that the reduced diameter portion 94a of the left mount tube 94 define an opening 94b therethrough that is manipulated into registry with an opening 22b defined through the tow tube 22. A pin 98 can then be passed through the left mount tube 94 and the tow bar 22 with a cotter pin 100 used to secure the pin 98. Although not shown in FIG. 7, the reduced diameter portion 96a of the right mount tube 96 can be similarly received in the other tow tube 24 to complete the connection of the hamper assembly 16 to the brush housing 14 and tow bar 12.

Figure 3:
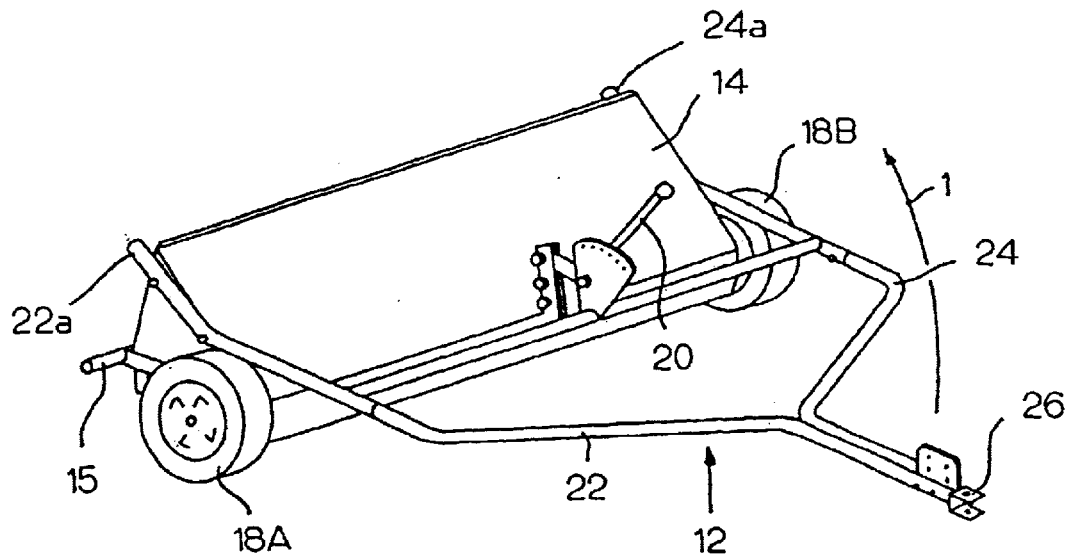
FIG. 3 is an enlarged perspective view of the brush housing and tow bar of the lawn sweeper of FIG. 1.
Figure 4:
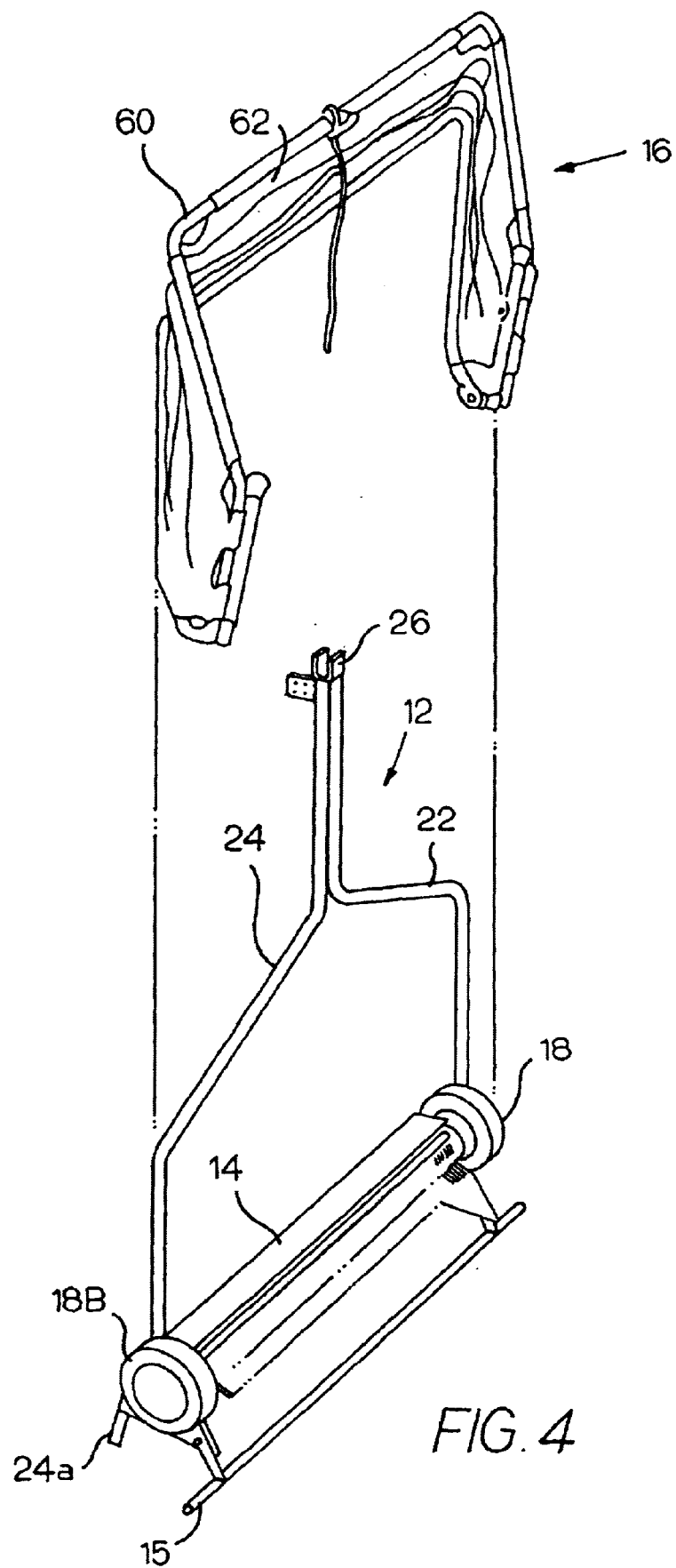
FIG. 4 is an enlarged perspective view of the brush housing and tow bar of the lawn sweeper of FIG. 1 rotated into an upright position for storage.

As mentioned above, another problem with prior art lawn sweepers relates to their size. Most lawn sweepers has a substantial footprint which prevents them from being easily stored. By constructing the lawn sweeper 10 in the manner described above, the lawn sweeper 10 of the present invention can be easily and rapidly manipulated into an upright storage position, dramatically decreasing its footprint. Specifically, as described in detail above with reference to FIGS. 6 and 7, the hamper assembly 16 can be detached from the brush housing 14 and tow bar 12 by removing the pins that secure the respective left and right mount tubes 94, 96 to the tow tubes 22, 24. Referring now to FIG. 3, a user can thus grasp the tow bar 12 and lift the combination tow bar 12 and brush housing 14 to an upright position (as indicated by arrow 1). As the combination tow bar 12 and brush housing 14 is lifted, it rotates about the wheels 18A, 18B of the lawn sweeper 10 until the stop bar 15 contacts the underlying ground surface. Continued lifting of the combination tow bar 12 and brush housing 14 causes rotation about the stop bar 15 until the portions 22a, 24a of the tow tubes 22, 24 which extend just beyond the brush housing 14 contact the underlying ground surface. At this point, the combination tow bar 12 and brush housing 14 is oriented in a substantially upright position, with the stop bar 15 and portions 22a, 24a of the tow tubes 22, 24 acting as foot members, as best shown in FIG. 4.

Then, the hamper assembly 16 may be collapsed for storage. Specifically, by removing the spring rods 90, 92 discussed above with respect to FIG. 6, the upper portion of the hamper frame 60 (i.e., the left and right upper side tubes 80, 82 and the upper rear tube 84) can be pivoted with respect to the lower portion of the hamper frame 60 (i.e., the left and right lower side tubes 70, 72, the lower rear tube 74, and the front stop rod 76) from the open position shown in FIG. 3 to the collapsed or closed position shown in FIG. 4.

Figure 5:
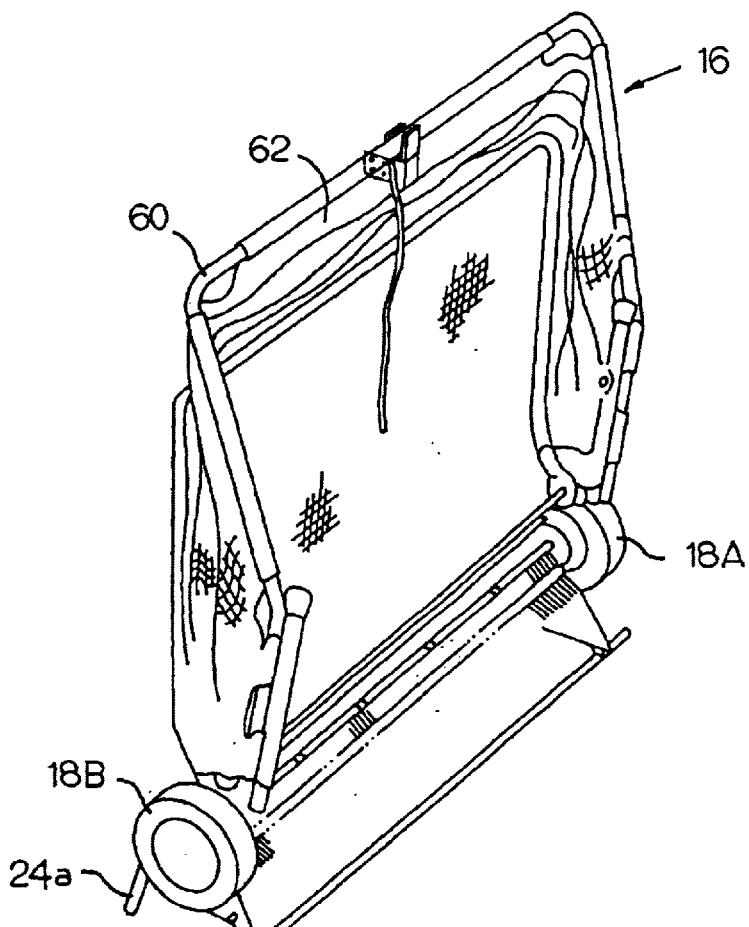
FIG. 5 is an enlarged perspective view of the brush housing and tow bar of the lawn sweeper of FIG. 1 rotated into an upright position for storage with the collapsed hamper assembly draped over the brush housing and tow bar.

Finally, as illustrated in FIG. 5, the collapsed hamper assembly 16 can be stored with the upright tow bar 12 and brush housing 14 with the upper rear tube 84 of the hamper frame 60 being received and retained in the channel 33 defined by the clevis portion 30 of the hitch clevis assembly 26. Although not shown in FIG. 5, the hitch pin 52 and associated cotter pin 54 associated with hitch clevis assembly 26 (as described above with reference to FIG. 2) can be used to secure the collapsed hamper assembly 16 to the hitch clevis assembly 26.

It will be obvious to those skilled in the art that further modifications may be made to the embodiments described herein without departing from the spirit and scope of the present invention.

What is claimed is:

1. A lawn sweeper adapted to be connected to a draw bar of a lawn implement, comprising:
   a tow bar comprised of two discrete tow tubes, each of said tow tubes defining a pair of openings therethrough near its distal end;
   a brush housing operably secured to said tow bar and containing a plurality of brushes mounted for rotation with respect to said brush housing;
   a hamper assembly secured behind said brush housing such that rotation of the brushes contained within said brush housing sweeps debris into said hamper assembly; and
   a hitch clevis assembly for connecting said tow bar to the draw bar of said lawn implement, said hitch clevis assembly including a clevis portion adapted to receive a hitch pin for selectively attaching said hitch clevis assembly to the draw bar of said lawn implement, and an upright member secured to the clevis portion and defining a plurality of openings therethrough. the upright member of said hitch clevis assembly being interposed between the tow tubes with one pair of the openings defined by the upright member in registry with the respective pairs of openings defined by the tow tubes, such that fasteners can be passed through the tow tubes and hitch clevis assembly to secure them to one another such that said hitch clevis assembly can be attached to said tow bar at a selected height.

2. A lawn sweeper as recited in claim 1, wherein said hitch clevis assembly defines four pairs of openings.

3. A lawn sweeper as recited in claim 2, wherein said four pairs of openings allow for attachment of the hitch clevis assembly to said tow bar at at least six discrete height settings.

4. A lawn sweeper as recited in claim 3, wherein said hitch clevis assembly allows the lawn sweeper to be connected to the draw bar of said lawn implement at a height between approximately six and eleven inches as measured from the underlying ground surface.

5. A lawn sweeper, comprising:
   a tow bar adapted to be connected to a draw bar of a lawn implement;
   a brush housing operably secured to said tow bar and containing a plurality of brushes mounted for rotation with respect to said brush housing; and
   a hamper assembly secured behind said brush housing such that rotation of the brushes contained within said brush housing sweeps debris into said hamper assembly, said hamper assembly including a frame and a fabric covering secured around and to said frame;
   wherein said brush housing includes a plurality of foot members extending therefrom such that said hamper assembly can be disengaged from said brush housing and said tow bar can be manipulated from an orientation substantially parallel to an underlying ground surface to an orientation substantially perpendicular to the underlying ground surface for storage of said lawn sweeper on said plurality of foot members.

6. A lawn sweeper as recited in claim 5, wherein the frame of said hamper assembly is comprised of an upper portion pivotally secured to a lower portion, such that the upper portion of said frame can be selectively pivoted with respect to the lower portion of said frame to transform said frame from an open position to a closed position for storage.

7. A lawn sweeper as recited in claim 6, wherein the frame of said hamper assembly further includes a pair spacing members that can be secured between the upper portion of said frame and the lower portion of said frame to maintain said frame in an open position.

8. A lawn sweeper as recited in claim 5, and further comprising a stop bar secured to a surface of said brush housing facing the hamper assembly, wherein said tow bar is comprised of two discrete tow tubes, said tow tubes being secured to opposite sides of the brush housing, and each tow tube having a portion that extends beyond the brush housing, the stop bar and the portions of the tow tubes extending beyond the brush housing serving as the plurality of foot members for storage of said lawn sweeper.

9. A lawn sweeper as recited in claim 6, wherein the upper portion of the frame of said hamper assembly is comprised of left and right upper side tubes and an upper rear tube, the upper rear tube being a substantially C-shaped member that is adapted to receive reduced diameter ends of the upper side tubes.

10. A lawn sweeper as recited in claim 9, wherein the lower portion of the frame of said hamper assembly is comprised of left and right lower side tubes, a lower rear tube, and a front stop rod, the lower rear tube being a substantially C-shaped member that is adapted to receive reduced diameter ends of the lower side tubes.

11. A lawn sweeper as recited in claim 10, wherein the left and right lower side tubes of the frame of said hamper assembly each have a first portion that is substantially parallel to the underlying ground surface and a second, upwardly inclined portion.

12. A lawn sweeper as recited in claim 11, wherein the left and right upper side tubes of the frame of said hamper assembly each have a first portion that is substantially parallel to the corresponding first portions of the left and right lower side tubes and a second, downwardly inclined portion, such that the left and right upper side tubes can be pivotally secured to the corresponding left and right lower side tubes.

13. A lawn sweeper as recited in claim 12, wherein the upper portion of the frame of said hamper assembly can be selectively pivoted with respect to the lower portion of the frame of said hamper assembly about a pivot axis defined by the front stop rod.

* * * * *